Patented June 17, 1947

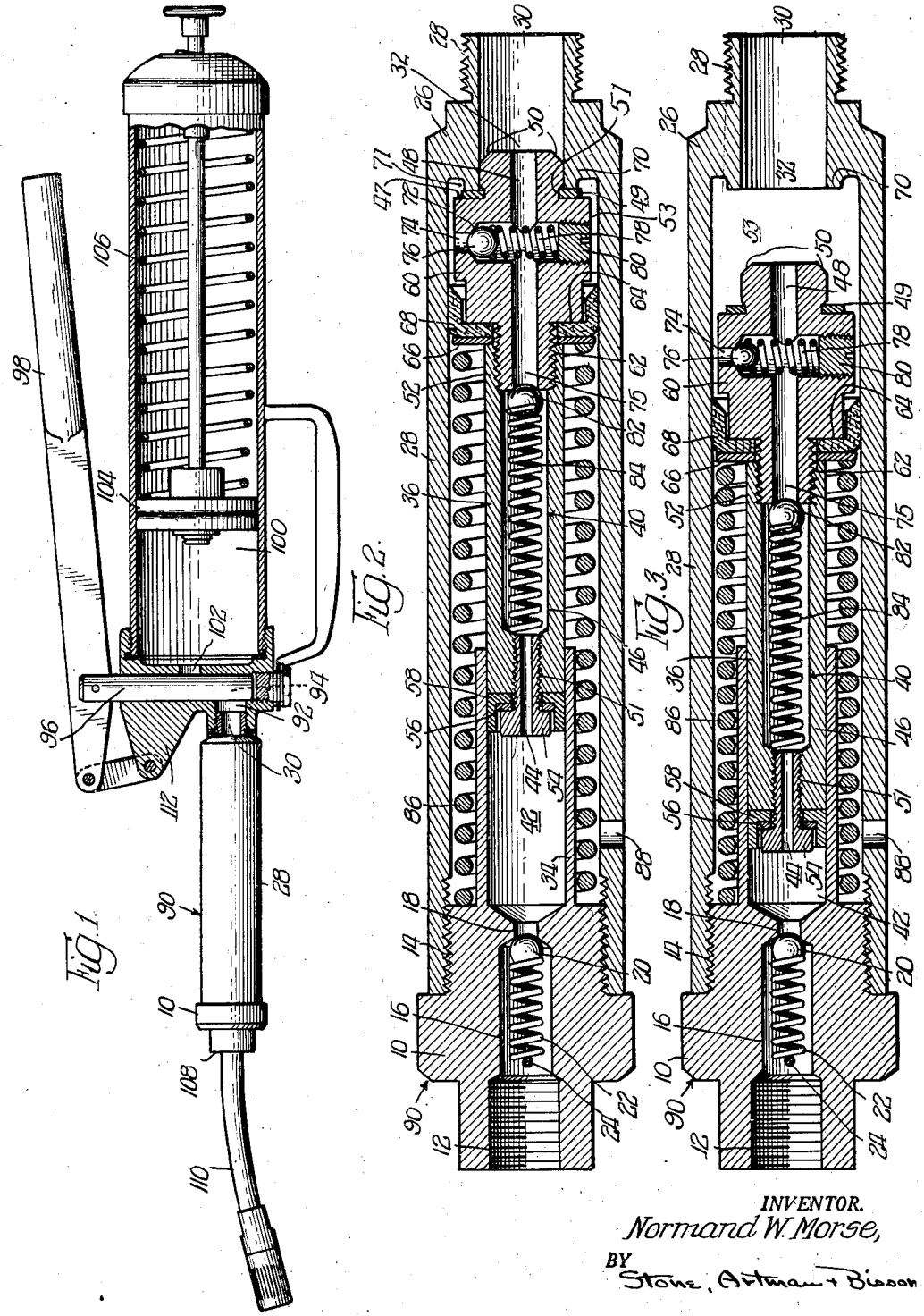

2,422,250

UNITED STATES PATENT OFFICE 2,422,250

PRESSURE BOOSTER FOR LUBRICATING SYSTEMS

Normand W. Morse, Chicago, Ill.

Application September 16, 1944, Serial No. 554,361

13 Claims. (Cl. 103—5)

1

This invention relates to a pressure booster for a lubricating system.

The pressure required to force lubricant to the various bearing points of a machine varies with the construction of the point, the load it carries, the extent of its wear, its freedom from dirt, etc. Lubrication apparatus, therefore, must have a pressure capacity to overcome the maximum resistance offered by any bearing point. In some machines, such as automobiles, most bearing points offer little resistance to the introduction of lubricant as compared with the bearing point offering the maximum resistance. Moreover, generally speaking, the low resistance bearing points are usually of a larger size and require a greater volume of lubricant than the high resistance bearing points. Consequently, lubrication apparatus should be able to deliver lubricant in greater volume per unit of time and effort to large, low resistance bearing points than to small, high resistance bearing points. Finally, it is desirable that lubrication apparatus perform these functions automatically so that a service man may go from lubricant fitting to lubricant fitting without manually adjusting the apparatus in any way but relying solely upon the back pressure offered by the particular fitting to regulate the pressure and speed of flow of lubricant delivered by the apparatus.

These desiderata have long been recognized and indeed have been partly solved in at least three general ways. Quite expensive apparatus providing a plurality of power pumps capable of maintaining various pressures and controlled by valves functioning in accordance with the back pressure in the delivery line are available on the market. A second type is manually controlled and consists of a booster placed in a low pressure line. See the patent to McCartie No. 1,569,039 dated February 14, 1928. In the McCartie structure there is a chamber in the low pressure line and a check valve between the chamber and the source of low pressure. When the resistance to flow at the lubricant fitting exceeds the pressure capacity of the low pressure source so that flow ceases, the check valves close. The operator can then manually contract the chamber so as to exert higher pressures in the delivery line. A third type of apparatus which theoretically at least is automatic, employs the general principle of the second type, that is of a plunger for increasing pressure in a chamber, but in this third type the plunger is mounted on a piston which uses the low pressure source as a prime mover and relies upon a mechanical differential between itself and the plunger to force the plunger to contract the high compression chamber. See for example, the Albertine Patent No. 1,633,357 dated June 21, 1927.

The present invention constitutes an improvement in the third type, and in order to make applicant's improvement clear, the third type will now be discussed in more detail. Using the structure shown in the Albertine Patent No. 1,769,982 dated July 8, 1930, as an example, the grease flows at low pressures through the duct 33 while slowly seeping past the notches 26a into the chamber behind the piston 42. As soon as this chamber (which bears no number) is filled, the piston 42 starts to move because the incoming lubricant expending its force on the full face of the piston will work against the springs with the result that the booster may completely empty chamber 28 before any demand for high pressure has occurred. In effect, these type three boosters are always in position to boost the pressure, with the result that they always boost the pressure, even to low pressure bearing points, with resulting delivery of small amounts of lubricant. They are, therefore, time wasters. Most bearings require much lubricant at low pressures but these boosters deliver little lubricant at high pressures and consequently a hand pump must be functioned several times at a low pressure nipple.

The first object of this invention is so to relate the piston of a type three booster to the low pressure line that the piston will not function until a selected high pressure resistance occurs in the delivery line at which time the piston will come into operation decisively and will continue as the primary pressure agency through the balance of a compression stroke by a pump. In attaining this end, applicant's booster presents a pressure surface to the low pressure liquid which will move the piston when a certain pressure is obtained, but when this pressure is obtained, the piston immediately thereafter presents much greater surface for actuation by the low pressure liquid so that thereafter the booster may be functioned without excessive effort by the source of pressure.

A second objection to this third type of booster resides in the fact that they do not have any position where they are clearly in a neutral position. When the piston 42 of the Albertine structure is functioning, only a comparatively small amount of grease will flow down the delivery passage. If at the time that a service man applied the gun to a low pressure nipple the piston 42 has partly functioned, the pump will force the piston 42 on to the right and evacuate the little chamber 28.

The second object of the present invention is to neutralize the booster at the end of each back stroke of the pump so that it cannot function in any way unless the critical, high back pressure is reached in the delivery line. These and such other objects as may hereinafter appear are obtained in the embodiment of the invention shown in one sheet of drawings wherein:

Figure 1 illustrates applicant's pressure booster as part of a complete lubricating system;

Figure 2 is a sectional view of the booster when it is functioning at low pressure; and Figure 3 is a sectional view of the booster when it is functioning at high pressure.

The pressure booster

While the great utility of applicant's pressure booster resides in its functional relationship with the other elements of a complete lubricating system, it is desirable to describe the pressure booster itself first. Referring to Figure 2, 10 identifies a head having an interiorly threaded portion 12 and an exteriorly threaded portion 14 with a passageway 16 and a reduced passageway 18. The threaded portion 12 and the passageways 16 and 18 together form an outlet for the pressure booster. Seated against the reduced passageway 18 is a conventional check valve comprising a ball 20, spring 22 and retaining pin 24 for holding the spring 22 in operable engagement with the ball 20. Numeral 26 identifies an end member complementary to the member 10. End member 26 has a long circular casing 28 interiorly threaded at its outer end to engage the threads at 14 of the member 10. Member 26 is exteriorly threaded at 29 and has an inlet passageway 30.

Returning now to the head 10, there is formed integrally therewith a sleeve 34 extending inwardly of the pressure booster. Positioned within the sleeve 34 and within the wall 28 of the member 26 is a piston 36. The end of the piston 36 adjacent to the sleeve 34 is of a size to fit snugly against the inside walls of the sleeve 34 while the other end of the piston 36 is of a size to fit snugly within the inside wall of portion 28 of member 26. Thus lengthwise movement of the piston 36 is assured by guides at each of its ends.

The cross sectional area of the pressure booster chamber 42 must be less than the cross sectional area of the opening 36, and by the opening 30, applicant refers to that portion that actually engages the face of the piston 60. Thus, if the gasket 49 and the pilot 50 were removed, the opening which engages the face of the piston 60 must be of greater area than the cross sectional area of the booster chamber 42. The actual size of the lubricant inlet which leads to opening 30 is immaterial. It is self-evident that if the area of the piston 60 against which the lubricant in opening 30 operates were equal to or less than the cross sectional area of pressure booster chamber 42, the piston 60 would never be unseated.

Coaxially of the piston 36 is a passageway generally identified by the arrow 40. This passageway extends from a chamber 42, which may be called the pressure booster chamber, to the inlet chamber 32. The size of the passageway 40 is critical only insofar as its opening into the pressure booster chamber 32 must be substantially smaller than the area of the end of the piston exposed to pressures in the inlet chamber 32. Thus, continuing to refer to Figure 2, the passageway 40 is composed of a reduced outlet 44, a central portion 46 of enlarged diameter to accommodate a check valve, and an inlet portion 48. The inlet opening 48 is substantially less in cross section than the area of the large piston chamber. Describing the piston 36, it consists of a main body portion interiorly threaded at 51 and 52. A centrally perforated bolt 54 holds a pair of conventional washer and gasket members 56 and 58 against the end of the piston 36 and in sealing relationship with the interior wall of the sleeve 34. The bolt 54 seats in the thread 51. A head member 60 having an exteriorly threaded portion 62 is screwed into the threads 52 and a ring 66 presses a seating member 68 toward a shoulder 64 of the head 60. The clearance between the annular side wall of the pilot 50 and the wall of the space 32 is substantial so that lubricant can reach the gasket 49. The end 47 of the piston 60 has a forwardly extending pilot 50 of a size that slips along the wall of the inlet 30 to fill that portion thereof shown in Figure 3 by the member 32. A recess 51 holds a gasket 49 which contacts an annular bead 70. This bead 70 forms a recess 71 in the member 26. A transverse passageway 74 connects the space 53 to the axial passageway 48—75 through the head member 60. In the passageway 74 there is a conventional check valve comprising a ball 76, spring 78 and set screw 80 for maintaining suitable pressure in the spring. Within the passageway 46 is a check valve comprising a ball 82 and a spring 84.

A helical spring 86 is positioned between the member 66 of the piston and the head 10 and between the outside wall of the piston 36 and the inside of the member 28. This spring presses the head 60 into the pressure booster chamber 32. A vent to air 88 is provided.

Referring now to Figure 1, the pressure booster which is generally identified by the numeral 90 has its inlet opening 30 positioned in the outlet 92 of a pump. This pump comprises a pressure chamber 94, a piston 96, a lever 98 for functioning the piston 96, a lubricant supply reservoir 100, passageway 102 from the lubricant supply reservoir 100 to the pressure chamber 94 and piston wall 104 and spring 106 for urging the lubricant toward the passageway 102. The outlet 12 of the pressure booster 90 is connected to a conventional coupling 110 or the pressure booster may be connected directly to the fitting to be lubricated.

Operation in a lubrication system

Describing the operation of the device, assuming that coupling 110 is connected to a fitting and that the pump generally identified by the numeral 112 has a normal (not maximum) pressure capacity of 500 pounds per square inch, an operator will force lubricant in the pressure chamber 94 through the pump outlet 92 into the pressure booster 90. Referring to Figure 2, the lubricant will pass through the passageways 30, 48, 46 and 44 into the pressure booster chamber 42, filling it, and thence on past the check-valve into the hose 108, see Figure 1. Returning to Figure 2, the lubricant in the passageway 30 does not force the head 60 to the left because the pressure exerted by the spring 86 is sufficiently great to resist a movement of the head 60 exerted on its smaller surface 50 by a pressure of 500 pounds or less.

In lubricating a bearing that requires less than 500 pounds' pressure, therefore, the pressure booster performs no function and interferes in no way with the operation of the pump 112. A substantial volume of lubricant, i. e. that contained in the pressure chamber 94 in Figure 1, can be forced through the coupling 110 by a single action of the lever arm 98.

Assuming now that the coupling 110 is connected to a fitting having great back pressure, the operator, referring to Figure 1, exerts normal pressure on the handle 98 only to come to a stop because the back pressure at the fitting exceeds 500 pounds to the square inch. The operator now exerts slightly greater pressure on the lever 98. For an instant, referring now to Figure 2, pressure exerted on the surface 50 of the head 60 exceeds the ability of the spring 86 to resist the movement of the head 60 to the left. The piston 60 unseats itself so as to expose its entire end area and the gasket 68 to the pressure of the lubricant which seeps past the gasket 49. In so doing the ball 82 seats itself as shown in Figure 3 while the spring 86 commences to contract. As the operator passes over the critical pressure necessary to unseat the head 60, the pump handle commences to work quite easily. Lubricant, however, does not flow through the piston 36. A much smaller amount of lubricant, however, is forced through the coupling 110. This lubricant comes from the pressure booster charge chamber 42 previously filled.

By this arrangement, the pump 112 which could be normally functioned by a hand operator to deliver about 500 pounds of pressure with a certain volume is automatically converted into a pump that can deliver a higher pressure in a volume inversely proportional to the increased pressure. In other words, the pump has two capacities. It can deliver a selected amount of lubricant at a high pressure and in the case of the pressure booster illustrated it can deliver a larger volume of lubricant at a selected low pressure. The two operating bases upon which the pump operates are therefore the maximum pressure that is required to lubricate the most resistant points on a machine and the pressure required to lubricate most of the parts of a machine, the objective being to provide a lubricating system which will deliver a good quantity of lubricant on each stroke of the handle 98 at either one of two pressures.

Returning now to the operation, when the pressure booster is in the position shown in Figure 3, and the lever 98 of Figure 1 has been completely depressed, the lever is then raised. As it is raised, the spring 86 forces the piston head 60 to the right. A certain amount of lubricant flows past the ball 82 and fills the pressure booster chamber 42, while the balance of the lubricant in front of the piston 60 backs up through the passageway 30 into the pump 112. As the surface 50 approaches the edge of the shoulder 70, grease will be trapped in the recess 71 and this grease will prevent the surface 50 from moving toward the opening 30 to the position shown in Figure 2. It is essential that this retractive movement of the piston 36 occur as early as possible in the suction stroke of the handle 98 because if the seating has not occurred when the handle 98 is depressed on a pressure stroke, the piston 36 will commence to move to the left, remaining in high pressure position so that only the small quantity of lubricant contained in the pressure booster chamber 42 will be forced through the coupling 110 even though high pressure is not required. This of course is all right if the operator is working on a point of high resistance. If, however, the coupling 110 had been shifted to a low pressure point on the machine, this point might require much more lubricant and yet on each depression of the handle 98 only a small portion of the capacity of the pump would be utilized to force lubricant through the coupling 110. It is therefore essential that the surface 50 seat well inside the inlet 30 on each suction stroke of the handle 98 of the pump 112 so that the system will be able to lubricate most efficiently whatever type of point of lubrication the coupling 110 is connected to.

It is evident therefore that the advance that applicant's booster makes over the prior art resides in the ability of applicant's booster to position or cock itself into a low pressure or neutral position at the end of each back stroke of the pump. This is accomplished by clearing the grease or lubricant from the recess 71, for otherwise the moment that the surface 50 cleared the inner edge of the inlet 30, the trapped grease would be able to stand off whatever pressure the spring 86 might exert. Applicant therefore provides the transverse passageway 74 and checkvalve, whereby the retractive movement of the piston 60 toward the passageway 30 is not retarded by an accumulation of lubricant between the outer portion of its end wall and the member 26 but continues until those two walls actually engage leaving the lubricant in space 71 at a lower pressure than theretofore existing. Insignificant as this may seem, this is one of the main features of applicant's device for it alone is responsible for keeping applicant's system in the low pressure position excepting when high back pressure has moved it into high pressure position.

Applicant's pressure booster is advantageously used in the following situation. In all high pressure bearings, there is a certain space in between the bearing and the fitting which must be prefilled before fresh lubricant can be forced into the bearing to displace contaminated or used lubricant in the bearing. Applicant's booster is such that the prefilling of this space may be performed at low pressures during the first part of a pressure stroke, and then when high resistance is encountered, the pressure booster will change into high pressure position and on the balance of the stroke, the operator can force the lubricant into the bearing, thus completing the lubrication of the bearing in a single stroke. This is to be contrasted with conventional high pressure equipment where an operator will approach a high pressure bearing with high pressure equipment and use that equipment to perform the pre-filling operation. Because such equipment delivers comparatively small volume on a single stroke, the operator is obliged to use more than one stroke in order to completely lubricate the bearing.

It will be understood in this connection that applicant's pressure booster is designed to function with a pump that has a positive stroke followed by a back suction stroke. Applicant's booster is not designed for use in a system where the lubricant in the inlet 30 is under constant pressure. Under such a condition, the piston 36 would move to its utmost limit to the left on the first call for high pressure and stay there. Applicant's booster, however, would be effective in a constant pressure system where after the end of a delivery stroke, means were provided for backing up the grease to a point ahead of the inlet and releasing it from the system. Under such circumstances, the power source would be functioned in very much the same manner as the hand pump shown in the drawings in Figure 1.

Attention is invited to the fact that the speed of manipulation of the handle 98 does not affect the operation of applicant's pressure booster other than to make the grease flow more rapidly. By manipulating the lever rapidly, additional pressures may not be obtained from applicant's pressure booster.

Having thus described my invention, I claim:

1. A pressure booster comprising a casing, a piston reciprocable in said casing, an inlet in the casing against which the piston may seat, said inlet having a smaller cross sectional area than the piston, means within the casing for urging the piston against the inlet, an outlet in the casing, means responsive to movement of the piston away from the inlet to deliver a quantity of lubricant at increased pressure through the outlet, and means for releasing any trapped lubricant between the piston and the casing wall around the inlet so that the urging means may seat the piston tightly against the inlet and hold it there until pressure against the restricted area of the piston opening to the inlet is sufficiently great to overcome the urging means.

2. A pressure booster comprising a casing, a piston reciprocable in said casing, an inlet in the casing against which the piston may seat, said inlet having a smaller cross sectional area than the piston, means within the casing for urging the piston against the inlet, an outlet in the casing, means responsive to movement of the piston away from the inlet to deliver a quantity of lubricant at increased pressure through the outlet, and means for releasing any trapped lubricant between the piston and the casing wall around the inlet so that the urging means may seat the piston tightly against the inlet and hold it there until pressure against the restricted area of the piston opening to the inlet is sufficiently great to overcome the urging means, said last named means comprising a release passageway from the surfaces of the piston engaging the walls of the casing around the inlet.

3. A pressure booster comprising a casing, a piston reciprocable in said casing, an inlet in the casing against which the piston may seat, said inlet having a smaller cross sectional area than the piston, means for urging the piston toward the inlet, a space between the piston and the casing at the inlet end when the piston is tightly seated over the inlet, an outlet in the casing on the delivery side of the piston, means responsive to movement of the piston away from the inlet to deliver a quantity of lubricant at increased pressure through the outlet, and means for releasing any trapped lubricant from the said space when the urging means seeks to seat the piston tightly against the inlet.

4. A pressure booster comprising a casing, a piston reciprocable in said casing, an inlet through the casing on one side of the piston, said inlet having a smaller cross sectional area than the piston, an outlet through said casing on the other side of the piston, the space between the outlet and the piston constituting a pressure booster chamber, a spring urging the piston against the inlet opening, means for introducing lubricant into the pressure delivery chamber, means responsive to movement of the piston away from the inlet to deliver a quantity of lubricant at increased pressure through the outlet, a space between the piston and the casing at the inlet end when the piston is tightly seated over the inlet, and means for releasing the lubricant from this space so that the piston may seat tightly against the inlet.

5. A pressure booster comprising a cylindrical casing having closed ends, an inlet in one end having a cross sectional area less than the inside diameter of the casing, an outlet in the other end of the casing, a piston reciprocable axially within the casing, a spring urging the piston against the inlet, a space between the piston and the casing at the inlet end when the piston is tightly seated over the inlet, a passageway connecting that point on the piston that opens to the inlet with the outlet side of the piston, means responsive to movement of the piston away from the inlet to deliver a quantity of lubricant at increased pressure through the outlet, and means for releasing lubricant in the said space so that the spring may seat the piston tightly against the inlet.

6. A pressure booster comprising a cylindrical casing closed at both ends, a piston reciprocable in said casing, an inlet at one end of the casing having a cross sectional area less than the face of the piston, an outlet in the other end of the casing, a pressure booster chamber extending inwardly of the casing from the outlet, a plunger mounted on the piston for axial movement in the pressure booster chamber, the face area of said plunger being less than the cross sectional area of the inlet, a passageway from that point on the piston that is in longitudinal alignment with the inlet to the pressure booster chamber, a spring urging the piston against the inlet, a space between the piston and the casing at the inlet end when the piston is tightly seated over the inlet, and means for releasing lubricant from said space so that the spring may seat the piston tightly against the inlet.

7. A pressure booster comprising a cylindrical casing, a piston reciprocable in said casing, an inlet axially disposed in one end of said casing and having a cross sectional area of less than the face of the piston, an outlet axially disposed in the other end of the piston, a pressure booster chamber extending axially from the outlet inwardly of the cylindrical casing, the cross sectional area of said booster chamber being less than the cross sectional area of the inlet, a plunger mounted on the piston and slidable in said cylindrical booster chamber, an expansion spring mounted between the outlet end of the casing and the piston so as to urge the piston against the inlet, an axial opening through the piston and its attached plunger so as to provide communication from the inlet to the pressure booster chamber, a check valve precluding flow from the pressure booster chamber toward the inlet, and means for releasing any lubricant trapped between the piston and the end of the casing around the inlet whereby the spring may prevent the seepage of lubricant from the inlet onto the enlarged area of the piston until the pressure exerted on the face of the portion of the piston opening to the inlet is sufficiently great to overcome the spring.

8. A pressure booster comprising a cylindrical casing closed at both ends, a piston reciprocable in said casing, an inlet at one end of the casing having a cross sectional area less than the face of the piston, an outlet in the other end of the casing, a pressure booster chamber extending inwardly of the casing from the outlet, the cross sectional area of said booster chamber being less than the cross sectional area of the inlet, a plunger mounted on the piston for axial movement in the pressure booster chamber, a passageway from that point on the piston that is in longitudinal alignment with the inlet to the pressure booster chamber, a check valve precluding flow from the outlet into the pressure booster chamber to the inlet in said passageway, a spring urging the piston against the inlet, a space between the piston and the casing at the inlet end when the piston is tightly seated over the inlet, and means for releasing lubricant from said space so that the spring may seat the piston tightly against the inlet.

9. A pressure booster comprising a cylindrical casing closed at both ends, a piston reciprocable in said casing, an inlet at one end of the casing having a cross sectional area less than the face of the piston, an outlet in the other end of the casing, a pressure booster chamber extending inwardly of the casing from the outlet, the cross sectional area of said booster chamber being less than the cross sectional area of the inlet, a plunger mounted on the piston for axial movement in the pressure booster chamber, a passageway from that point on the piston that is in longitudinal alignment with the inlet to the pressure booster chamber, a check valve precluding flow from the outlet into the pressure booster chamber, a check valve precluding flow from the pressure booster chamber to the inlet in said passageway, a spring urging the piston against the inlet, a space between the piston and the casing at the inlet end when the piston is tightly seated over the inlet, and means for releasing lubricant from said space so that the spring may seat the piston tightly against the inlet, said means comprising a release port between said space and said passageway and a check valve precluding lubricant flowing through to the said space.

10. A pressure booster comprising a casing, a piston reciprocable in said casing, an inlet in the casing against which the piston may seat, said inlet having a smaller cross sectional area than the piston, a projection on the piston of a size to seat in the inlet, means for urging the piston toward the inlet, a space between the piston and the casing at the inlet end when the piston is tightly seated over the inlet, an outlet in the casing on the delivery side of the piston, means for introducing a lubricant on the delivery side of the piston, means responsive to movement of the piston away from the inlet to deliver a quantity of lubricant at increased pressure through the outlet, and means for releasing any trapped lubricant from the said space when the urging means seeks to seat the projection in the piston within the inlet.

11. A pressure booster comprising a cylindrical casing, a piston reciprocable in said casing, an inlet axially disposed in one end of said casing and having a cross sectional area of less than the face of the piston, a projection on the piston of a size to seat in the inlet, an outlet axially disposed in the other end of the piston, a cylindrical pressure booster chamber extending axially from the outlet inwardly of the cylindrical casing, the cross sectional area of said booster chamber being less than the cross sectional area of the inlet, a plunger mounted on the piston and slidable in said cylindrical booster chamber, an expansion spring mounted between the outlet end of the casing and the piston so as to urge the projection of the piston against the inlet, an axial opening through the piston and its attached plunger so as to provide communication from the inlet to the pressure booster chamber, a check valve precluding flow from the pressure booster chamber toward the inlet, and means for releasing any lubricant trapped between the piston and the end of the casing around the inlet whereby the spring may prevent the seepage of lubricant from the inlet onto the enlarged area of the piston until the pressure exerted on the face of the portion of the piston opening to the inlet is sufficiently great to overcome the spring.

12. A lubricating system comprising a plunger pump, a lubricant delivery line, and a pressure booster in said delivery line comprising a piston chamber, a piston reciprocatably mounted in said chamber, an inlet at one end of the chamber of substantially smaller cross sectional area than the face of the piston, a plunger of substantially less cross sectional area than the face of the piston mounted on the side of the piston away from the inlet, a plunger chamber for said plunger, and a passageway through the piston face and through the plunger connecting the piston chamber and inlet to the plunger chamber, and means for seating the piston tightly over the inlet at the end of each suction stroke of the pump, whereby the piston of the pressure booster will only be functioned on a pressure stroke when the back pressure is sufficiently great to unseat the piston from the inlet.

13. A lubricating system comprising a plunger pump, a lubricant delivery line, and a pressure booster in said delivery line comprising a piston chamber, a piston reciprocatably mounted in said chamber, an inlet at one end of the chamber of substantially smaller cross sectional area than the face of the piston, a plunger of substantially less cross sectional area than the face of the piston mounted on the side of the piston away from the inlet, a plunger chamber for said plunger, and a passageway through the piston face and through the plunger connecting the piston chamber and inlet to the plunger chamber, and means for seating the piston tightly over the inlet at the end of each suction stroke of the pump, whereby the piston of the pressure booster will only be functioned on a pressure stroke when the back pressure is sufficiently great to unseat the piston from the inlet, said last named means comprising a port connecting the surface of the piston adjacent to the portions of the pressure booster around the inlet where lubricant may be trapped on a back stroke movement of the piston to the inlet of the pressure booster, there being a check valve precluding the flow of lubricant in the reverse direction in the passageway.

NORMAND W. MORSE.

REFERENCES CITED

The following references are of record in the file of this patent:

UNITED STATES PATENTS

| Number | Name | Date |
| --- | --- | --- |
| 1,769,982 | Albertine | July 8, 1930 |